US008740508B2

(12) United States Patent
Jansson

(10) Patent No.: US 8,740,508 B2
(45) Date of Patent: Jun. 3, 2014

(54) MILLING TOOL WITH CLAMPING SCREW HAVING MALE GRIP AT END THEREOF

(75) Inventor: Mikael Jansson, Avesta (SE)

(73) Assignee: Seco Tools AB, Fagersta (SE)

( * ) Notice: Subject to any disclaimer, the term of this patent is extended or adjusted under 35 U.S.C. 154(b) by 302 days.

(21) Appl. No.: 13/086,172

(22) Filed: Apr. 13, 2011

(65) Prior Publication Data
US 2011/0268512 A1 Nov. 3, 2011

(30) Foreign Application Priority Data

Apr. 30, 2010 (EP) ..................................... 10161613

(51) Int. Cl.
*B23C 5/22* (2006.01)
(52) U.S. Cl.
CPC ........................................ *B23C 5/22* (2013.01)
USPC ............................................ 407/40; 411/410
(58) Field of Classification Search
USPC ........... 407/40, 47, 48, 103; 411/388, 396, 410
IPC .......................................................... B23C 5/22
See application file for complete search history.

(56) References Cited

U.S. PATENT DOCUMENTS

| | | | | |
|---|---|---|---|---|
| 2,645,003 | A * | 7/1953 | Stanley et al. .................. | 407/46 |
| 2,850,934 | A * | 9/1958 | Sehn .............................. | 411/388 |
| 3,533,150 | A | 10/1970 | Welch | |
| 3,654,682 | A | 4/1972 | Newbould | |
| 3,815,195 | A | 6/1974 | McCreery | |
| 4,430,031 | A * | 2/1984 | Hellstrom ..................... | 407/104 |
| 4,470,732 | A * | 9/1984 | Lindsay ........................ | 407/104 |
| 4,492,500 | A * | 1/1985 | Ewing ............................... | 411/5 |
| 4,506,715 | A | 3/1985 | Blackwell | |
| 5,207,545 | A * | 5/1993 | Kochanski .................... | 411/383 |
| 5,899,642 | A | 5/1999 | Berglow et al. | |
| 6,918,717 | B2 * | 7/2005 | Ben-Mucha .................. | 407/103 |
| 2008/0240873 | A1* | 10/2008 | Furuki .......................... | 407/107 |
| 2010/0303562 | A1* | 12/2010 | Hecht ........................... | 407/107 |

FOREIGN PATENT DOCUMENTS

| | | |
|---|---|---|
| DE | 3021355 A1 | 12/1981 |
| EP | 1197281 A1 | 4/2002 |
| EP | 173263 A1 | 12/2006 |
| FR | 1001909 A | 2/1952 |

(Continued)

OTHER PUBLICATIONS

Drozda, Thomas J, Tool and Manufacuturing Engineers Handbook, May 21, 1984, Society of Manufacturing Engineers, Fourth Edition, vol. 1, pp. 10-31 to 10-34.*

(Continued)

*Primary Examiner* — Andrea Wellington
*Assistant Examiner* — Alan Snyder
(74) *Attorney, Agent, or Firm* — WRB-IP LLP

(57) ABSTRACT

A milling tool includes a toolholder having an insert-receiving pocket, a cutting insert having a hole provided therein, the cutting insert being disposed in the pocket and a clamping screw having a male key grip at a first end and zero or more key grips at a second end. The clamping screw extends through the hole in the cutting insert into a threaded hole in the toolholder so that threads on the clamping screw mate with threads in the threaded hole. The male key grip is remote from the cutting insert. The second end of the clamping screw includes an enlarged head including a clamping surface that abuts a clamping surface in the hole of the cutting insert. A clamping screw suitable for a milling tool is also provided.

15 Claims, 4 Drawing Sheets

(56) References Cited

FOREIGN PATENT DOCUMENTS

| FR | 1496246 A | | 9/1967 |
|---|---|---|---|
| JP | 61175313 U | | 10/1986 |
| JP | 2-150103 | | 12/1990 |
| JP | H0720413 U | | 4/1995 |
| JP | 2005155768 A | | 6/2005 |
| JP | 2006247790 A | * | 9/2006 |
| WO | 0037202 A1 | | 6/2000 |
| WO | 03074217 A1 | | 9/2003 |

OTHER PUBLICATIONS

English translation of JP 2006247790.*

International Search Report for corresponding International App. PCT/EP2011/055597.

European Search Report for corresponding European App. EP 10 16 1613.

* cited by examiner

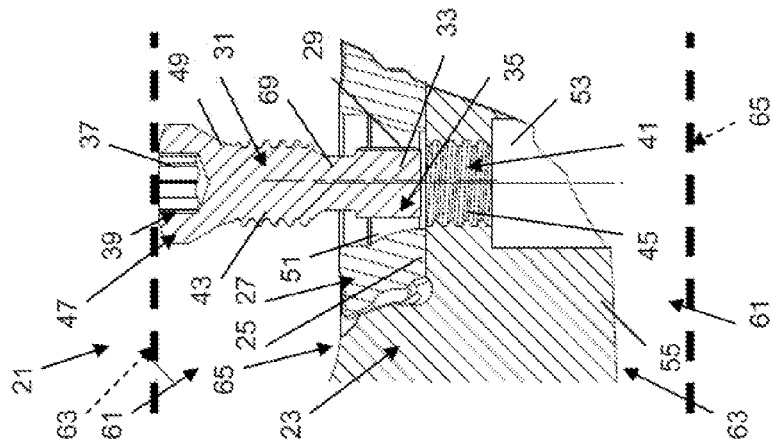
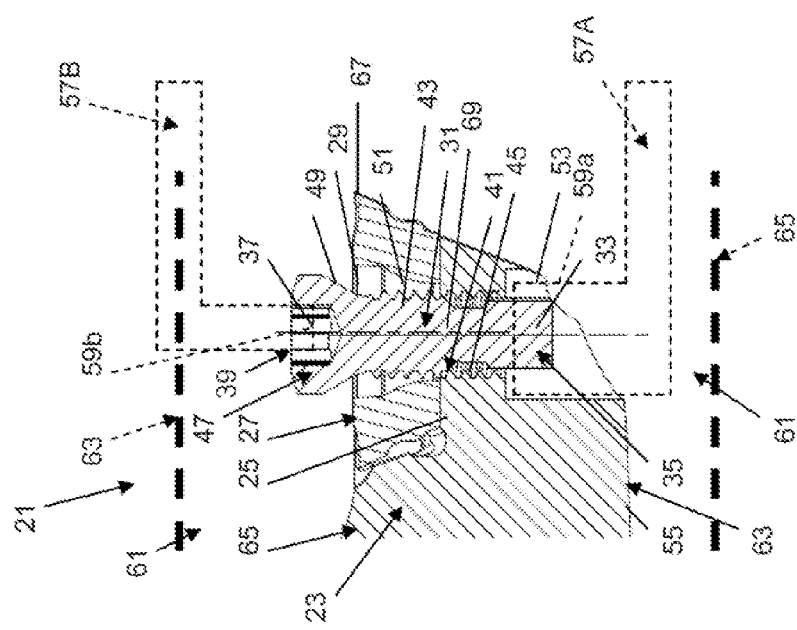
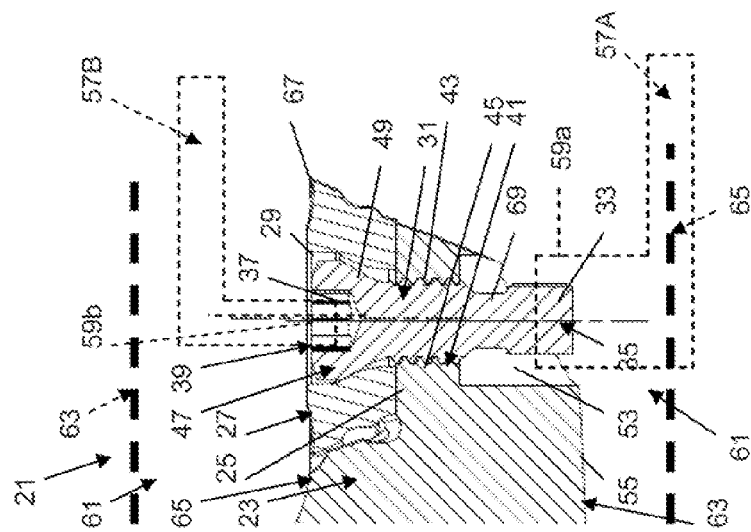

MILLING TOOL WITH CLAMPING SCREW HAVING MALE GRIP AT END THEREOF

BACKGROUND AND SUMMARY

The present invention relates generally to milling tools and, more particularly, to milling tools in which cutting inserts are secured to a toolholder by a clamping screw. The invention also relates to a clamping screw suitable for a milling tool.

In milling tools for metal removal, it is often desirable to position a plurality of cutting inserts around the periphery of the toolholder body. A typical technique of securing the inserts in pockets formed on the toolholder body is via a screw that extends through a hole in the insert and into a threaded hole in the toolholder body. Typically, the screw has an enlarged head that clamps against a surface in the hole in the insert to clamp the insert in place. The enlarged head usually includes a key grip, typically a female key grip, that can be driven by a male tightening (or removal) tool or "key". For various reasons, it may be difficult or impossible to access the key grip on the clamping screw with the male tool. For example, due to provision of a large number of closely spaced inserts around the periphery of the toolholder, flutes in the toolholder may be configured so that there is insufficient clearance space for a tool to enter the key grip on the insert. JP 61 175313 U discloses a milling tool having a clamping screw easily accessible from the chip space of an adjacent milling insert. DE 30 21 355 A1 discloses a milling tool having a clamping screw with key grips at its ends.

It is desirable to provide a milling tool that facilitates tightening of a clamping screw even though a key grip on the clamping screw is inaccessible by a tightening tool, such as when the imaginary extension of the screw axis intersects a preceding tool portion in the tool's rotational direction.

A milling tool includes a toolholder having an insert-receiving pocket, a cutting insert having a hole provided therein, the cutting insert being disposed in the pocket, and wherein a clamping screw has a male key grip at a first end and zero or more key grips at a second end, the clamping screw extending through the hole in the cutting insert into a threaded hole in the toolholder so that threads on the clamping screw mate with threads in the threaded hole, said male key grip being remote from the cutting insert, the second end of the clamping screw comprising an enlarged head comprising a clamping surface that abuts a clamping surface in the hole of the cutting insert. A clamping screw suitable for a milling tool includes a male key grip at a first end and zero or more key grips at a second end, threads being arranged on the clamping screw between the first end and the second end, wherein the second end of the clamping screw comprises an enlarged head comprising a clamping surface.

BRIEF DESCRIPTION OF THE DRAWINGS

The features and advantages of the present invention are well understood by reading the following detailed description in conjunction with the drawings in which like numerals indicate similar elements and in which:

FIGS. 2A-2C are schematic, cross-sectional views of another milling tool according to an embodiment of the present invention;

DETAILED DESCRIPTION

Figure 1:
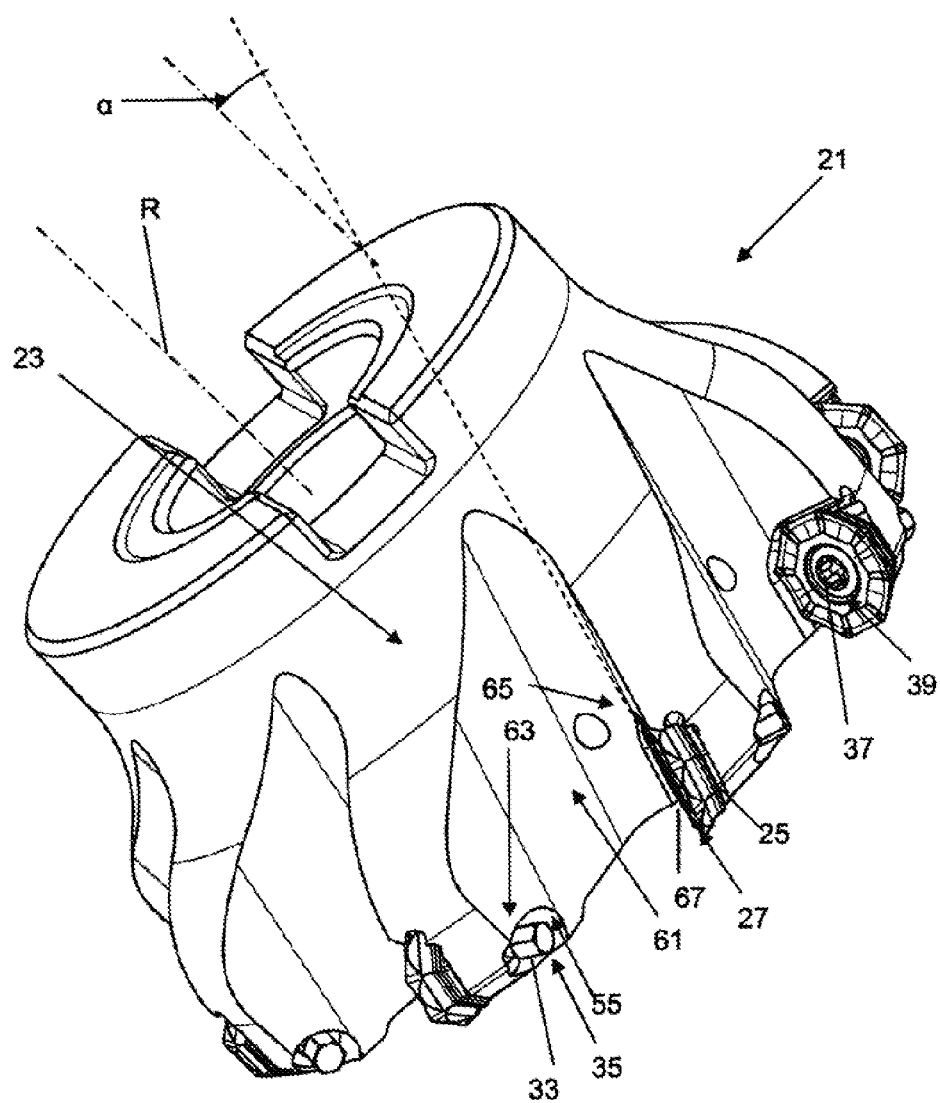
FIG. 1 is a perspective view of a milling tool according to an embodiment of the present invention.

A milling tool 21 according to an aspect of the present invention is shown in FIG. 1. The milling tool 21 comprises a toolholder 23 having an insert-receiving pocket 25. The milling tool 21 further comprises a cutting insert 27 having a hole 29 provided therein. The hole 29 may extend substantially centrally through the insert 27 as seen in FIGS. 1 and 2A-2C, or may be disposed off-center, such as at an edge of the insert. The cutting insert 27 can be manufactured from directly pressed cemented carbide. By the term "cemented carbide" is here meant WC, TiC, TaC, NbC, etc., in sintered combination with a binder metal such as, for instance, Co or Ni. The cutting insert is preferably at least partly coated with layers of, e.g., $Al_2O_3$, TiN and/or TiCN. In certain cases, it may be justified that the cutting edges consist of soldered superhard materials such as CBN or PCD.

The cutting insert 27 is disposed in the pocket 25. A clamping screw 31 is provided having a male key grip 33 at a first end 35 and, ordinarily, a key grip 37, ordinarily but not necessarily a female key grip, at a second end 39. Further references to the key grip 37 will refer to it as a female key grip, it being understood that the key grip need not be a female key grip. The female key grip 37 at the second end 39 can be omitted, if desired, so that there is only a male key grip 33 at the first end 35 of the clamping screw 31. While not illustrated, it will be appreciated that more than one key grip can be provided at either end of the clamping screw, such as by providing a male key grip around circumference of the end into which a female key grip extends. By the expression "key grip" it is intended to refer to male and female fastener components that are adapted to be driven by a specially adapted tool typically referred to as a "key", however, it will be understood that other types of tools not specially adapted for use with the particular milling tool or clamping screw might be usable, as well.

Figure 3D:
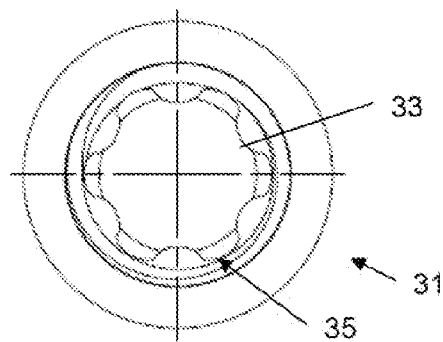
FIGS. 3A-3D are perspective, side, top, and bottom views of a clamping screw according to an embodiment of the present invention.
Figure 3A:
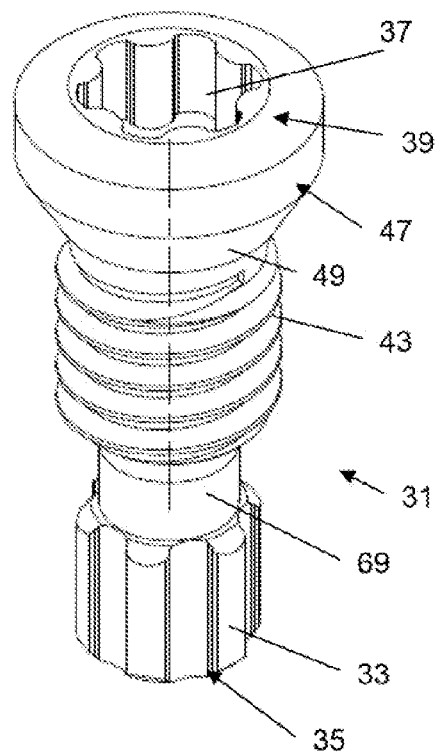
Figure 3B:
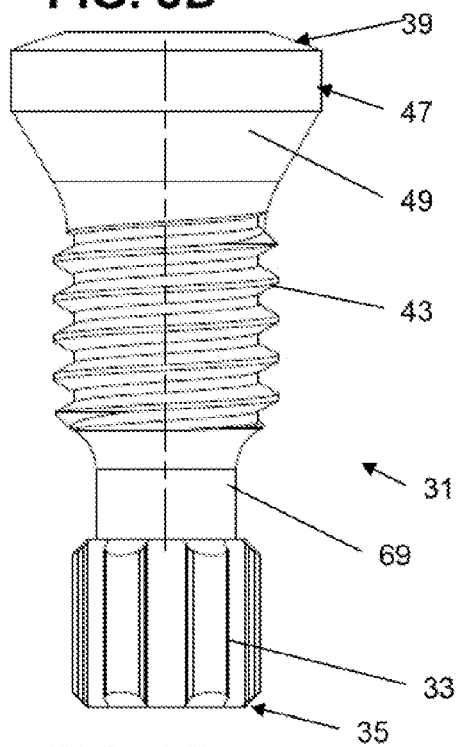
Figure 3C:
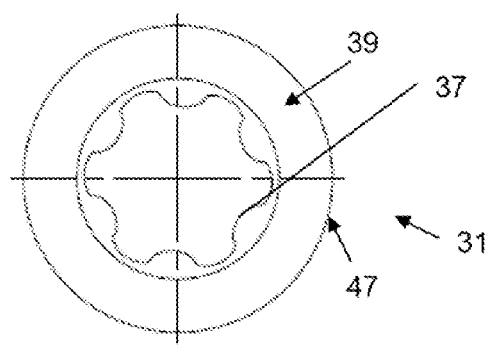
Figure 4D:
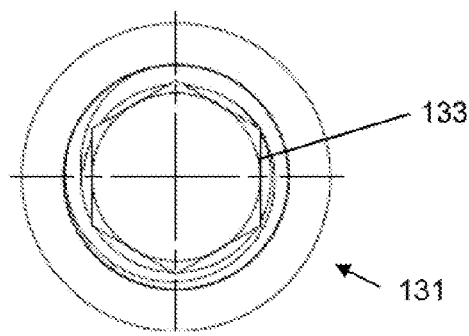
FIGS. 4A-4D are perspective, side, top, and bottom views of a clamping screw according to another embodiment of the present invention.
Figure 4A:
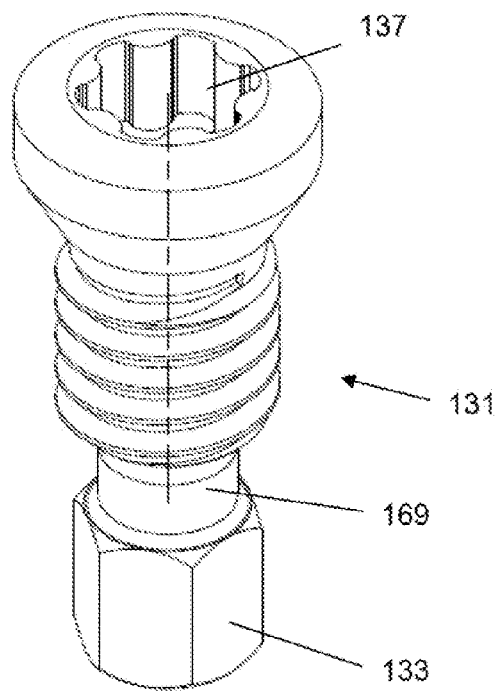
Figure 4B:
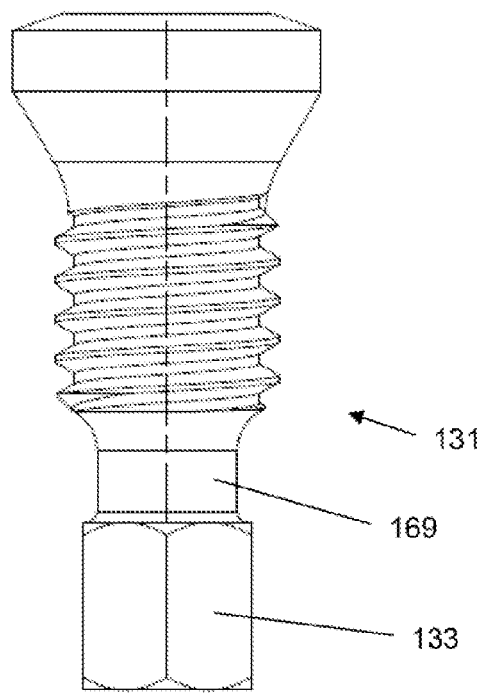
Figure 4C:
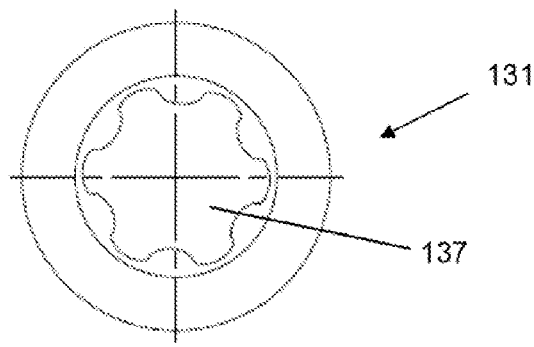

As seen in FIGS. 2A-2C, the clamping screw 31 extends through the hole 29 in the cutting insert 27 into a threaded hole 41 in the toolholder 23 so that threads 43 on the clamping screw mate with threads 45 in the threaded hole. The second end 39 of the clamping screw 31 comprises an enlarged head 47 comprising a clamping surface 49 that abuts a clamping surface 51 in the hole 29 of the cutting insert 27 when the clamping screw is fully installed, as seen in FIG. 2A. The enlarged head 47 is preferably symmetrical with respect to the axis of the screw (shown in dashed lines in FIGS. 3B and 4B). The clamping surface 49 can be conical. The insert 27 can be indexable to a plurality of different positions to facilitate use of multiple cutting edges on the insert. Ordinarily, the toolholder comprises a plurality of insert-receiving pockets, and the milling tool comprises a corresponding plurality of cutting inserts and clamping screws.

The threaded hole 41 in the toolholder 23 may connect the pocket 25 with an enlarged hole 53 extending to an external surface 55 of the toolholder or the hole 41 may extend all the way to the external surface 55. The first end 35 of the clamping screw 31 can be disposed in the enlarged hole 53 so that the male key grip 33 is remote from the cutting insert 27. The enlarged hole 53 is of sufficient size to permit a tool 57A (shown in phantom in FIG. 2B) including a female key grip 59a adapted to mate with the male key grip 33 at the first end 35 of the clamping screw 31 to mate with the male key grip and turn the clamping screw. The external surface 55 of the toolholder 23 to which the enlarged hole 53 extends may be, as seen in FIG. 1, a surface of an enlarged recessed area or flute 61 of the toolholder. The enlarged hole 53 will typically be in one leg 63 of the flute 61 and will typically face a pocket 25 for another insert 27 on another leg 65 of the flute.

As seen in FIG. 1, the insert 27 can be mounted relative to the toolholder 23 such that a working cutting edge 67 of the insert forms an angle α relative to an axis R of rotation of the toolholder. In FIG. 1, the insert's cutting edge 67 forms a so-called axial angle α with the axis R of rotation that can be between 0°-45°, preferably between 15°-20°. The angle α is ordinarily positive, but can be negative.

As seen in FIGS. 3A-3D, the male key grip 33 can be sized so that it is receivable in the female key grip 37, such as where the male key grip is a same type of key grip as the female key grip so that the male key grip and the female key grip are adapted to mate with female key grips and male key grips, respectively, on other, identical clamping screws 31. The male key grip 133 may, alternatively, be a different type of key grip than the female key grip 137 as seen in the clamping screw 131 shown in FIGS. 4A-4D showing a "TORX" type female key grip and a hexagonal male key grip. While the male key grip 133 shown is too large to be received in the female key grip 137, the male key grip can be smaller in other embodiments so that it can be received in the female key grip.

In the clamping screws 31 or 131, a largest cross-sectional dimension of the male key grip 33 or 133 is no larger than a smallest cross-sectional dimension of the threads 45 in the threaded hole 41 in the toolholder 23 so that the male key grip is adapted to pass through the threaded hole, and ordinarily no larger than a smallest cross-sectional dimension of the threads 43 on the clamping screw. The clamping screw 31 or 131 can comprise a neck portion 69 or 169 between the threads and the male key grip. The neck portion 69 or 169 may be useful to provide a longer clamping screw without necessarily making the threads 43 or the male key grip 33 or 133 longer. The illustrated neck 69 is smaller in diameter than the threads 43 and the male key grips 33 or 133, but it may be larger in diameter than the male key grips, as long as it is sufficiently small to be able to pass through the threaded hole 41 in the toolholder 23. While the present application primarily discusses embodiments of a clamping screw 31 having male and female key grips of the same type, it will be appreciated that such a clamping screw can ordinarily be replaced with a clamping screw 131 having male and female key grips of different types, except as otherwise indicated herein.

As seen in FIGS. 2A-2C, the toolholder 23 and the clamping screw 31 may be configured such that at least one of the male key grip 33 and the female key grip 37 is inaccessible by a tool adapted to mate with the at least one of the male key grip and the female key grip during at least part of an installation or a removal of the clamping screw. Further, the toolholder 23 and the clamping screw 31 may be configured such that the female key grip 37 is inaccessible by a tool adapted to mate with the female key grip during at least part of an installation or a removal of the clamping screw and such that the male key grip 33 is inaccessible by a tool adapted to mate with the male key grip during at least a different part of the installation or the removal of the clamping screw. These situations may occur when, for example, the size of the flute 61 in the toolholder must be limited, such as due to close positioning of inserts 27 around the periphery of the toolholder 23.

By providing a male key grip 33 and the female key grip 37 at first and second ends 35 and 39 of the clamping screw 31, when one key grip, say the male key grip, is inaccessible by a tool 57A as shown in FIG. 2A, such as because the tool would abut a wall 65 of the flute 61, the female key grip is accessible by a tool 57B (shown in phantom in FIG. 2A) including a male key grip 59*b* adapted to mate with the female key grip. When the other key grip, say the female key grip 37, is inaccessible by a tool 57B as shown in FIG. 2B, such as because it would abut a wall 63 of a flute 61, the male key grip is accessible by a tool 57A. Thus, the tool 57A can be used to drive the clamping screw from the beginning of the installation (FIG. 2B) until the tool 57A can no longer be used and the tool 57B can be used to finish installation (to the position shown in FIG. 2A) or, during removal, when the tool 57B can no longer be used, the tool 57A can be used until the screw is in a position to be removed, as seen in FIG. 2C. In this way, it is possible to use one tool 57A or 57B or the other to tighten the clamping screw substantially regardless of the position of the clamping screw.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 10161613.4, from which this application claims priority, are incorporated herein by reference.

The invention claimed is:

1. A milling tool, comprising:
a toolholder having an insert-receiving pocket;
a cutting insert having, a hole provided therein, the cutting insert being disposed in the pocket; and
a clamping screw having a male key grip at a first end and zero more key grips at a second end, the clamping screw extending, through the hole in the cutting insert into a threaded hole in the toolholder so that threads on the clamping screw mate with threads in the threaded hole, wherein axes of the hole in the cutting insert and the threaded hole are substantially parallel, wherein the male key grip is remote from the cutting insert, wherein the second end of the clamping screw comprises an enlarged head comprising an annular clamping surface that abuts an annular clamping surface in the hole of the cutting insert so that the clamping surface of the head contacts the clamping surface in the hole around part of an entire periphery of the hole.

2. The milling tool as set forth in any of claim 1, wherein the threaded hole in the toolholder connects the pocket to an external surface of the toolholder.

3. The milling tool as set forth in claim 2, wherein the first end of the clamping screw is disposed in an enlarged hole extending, to the external surface of the toolholder.

4. The milling tool as set forth in claim 1, wherein the insert is mounted relative to the toolholder such that a working cutting edge of the insert forms an axial angle relative to an axis of rotation of the toolholder.

5. The milling tool as set forth in claim 4, wherein the axial angle of the cutting of the insert is between 0°-45°.

6. The milling tool as set forth in claim 1, wherein the zero or more key grips comprises a female key grip and the male key grip is receivable in the female key grip.

7. The milling tool as set forth in claim 1, wherein the zero or more key grips comprises at least one key grip and the male key grip is a same type of key grip as the at least one key grip.

8. The milling tool as set forth in claim 1, wherein the zero or more key grips comprises at least one key grip and the male key grip is a different type of key grip than at least one the key grip.

9. The milling tool as set forth in claim 1, wherein a largest cross-sectional dimension of the male key grip is no larger than a smallest cross-sectional dimension of the threads on the clamping screw.

10. The milling tool as set forth in claim 1, wherein the clamping screw comprises a neck portion between the threads on the clamping screw and the male key grip.

11. The milling, tool as set forth in claim 1, wherein the zero or more key grips comprises at least one key grip, and the toolholder and the clamping screw are configured such that at least one of the male key grip and the key grip is inaccessible by a tool adapted to mate with the at least one of the male key grip and the key grip during at least part of an installation or a removal of the clamping screw.

12. The milling tool as set forth in claim 1, wherein the zero or more key grips comprises at least one key grip, and the toolholder and the clamping screw are configured such that the key grip is inaccessible by a tool adapted to mate with the key grip during at least part of an installation or a removal of the clamping screw and such that the male key grip is inaccessible by a tool adapted to mate with the male key grip during at least a different part of the installation or the removal of the clamping screw.

13. The milling tool as set forth in claim 1, wherein the toolholder comprises a plurality of insert-receiving pockets, and the milling tool comprises a corresponding plurality of cutting inserts and clamping screws.

14. The milling tool as set forth in claim 1, wherein the zero or more key grips comprises a female key grip and the male key grip and the female key grip have different, non-mating geometries.

15. The milling tool as set forth in claim 1, wherein the cutting insert comprises a cutting edge that defines a circle when the milling tool rotates, and the clamping screw extends generally in a direction of a tangent to the circle at the cutting edge.

* * * * *